(12) United States Patent
Kerr et al.

(10) Patent No.: US 8,233,597 B2
(45) Date of Patent: Jul. 31, 2012

(54) SYSTEM AND METHOD FOR THE PLAYING OF KEY PHRASES IN VOICE MAIL MESSAGES

(75) Inventors: Jim M. Kerr, Seattle, WA (US); Kevin L. Chestnut, Seattle, WA (US)

(73) Assignee: Cisco Technology, Inc., San Jose, CA (US)

(*) Notice: Subject to any disclaimer, the term of this patent is extended or adjusted under 35 U.S.C. 154(b) by 1855 days.

(21) Appl. No.: 11/057,333

(22) Filed: Feb. 11, 2005

(65) Prior Publication Data

US 2006/0182232 A1 Aug. 17, 2006

(51) Int. Cl.
*H04M 1/64* (2006.01)
(52) U.S. Cl. .................. 379/88.22; 379/88.01
(58) Field of Classification Search .............. 379/88.01, 379/88.23–88.25
See application file for complete search history.

(56) References Cited

U.S. PATENT DOCUMENTS

| | | | | |
|---|---|---|---|---|
| 6,625,261 B2 * | 9/2003 | Holtzberg | ........... | 379/88.23 |
| 6,661,886 B1 | 12/2003 | Huart et al. | ........... | 379/215.01 |
| 6,724,887 B1 * | 4/2004 | Eilbacher et al. | ........... | 379/265.03 |
| 6,741,705 B1 | 5/2004 | Nelson et al. | ........... | 380/257 |
| 6,879,685 B1 * | 4/2005 | Peterson et al. | ........... | 379/265.11 |
| 6,907,112 B1 * | 6/2005 | Guedalia et al. | ........... | 379/88.17 |
| 7,039,585 B2 * | 5/2006 | Wilmot et al. | ........... | 704/235 |
| 7,092,496 B1 * | 8/2006 | Maes et al. | ........... | 379/88.01 |
| 7,219,054 B1 * | 5/2007 | Begeja et al. | ........... | 704/231 |
| 7,272,213 B2 * | 9/2007 | Holtzberg | ........... | 379/88.25 |
| 7,457,396 B2 * | 11/2008 | Claudatos et al. | ........... | 379/88.03 |
| 7,466,334 B1 * | 12/2008 | Baba | ........... | 348/14.06 |
| 7,478,044 B2 * | 1/2009 | Kirkland et al. | ........... | 704/235 |
| 7,487,086 B2 * | 2/2009 | Griggs | ........... | 704/235 |
| 7,499,531 B2 * | 3/2009 | Claudatos et al. | ........... | 379/88.25 |
| 7,577,568 B2 * | 8/2009 | Busayapongchai et al. | .. | 704/260 |
| 7,668,721 B2 * | 2/2010 | Barkley et al. | ........... | 704/275 |
| 7,707,037 B2 * | 4/2010 | Claudatos et al. | ........... | 704/275 |
| 7,751,538 B2 * | 7/2010 | Claudatos et al. | ........... | 379/88.25 |
| 7,924,986 B2 * | 4/2011 | Sadowski et al. | ........... | 379/88.18 |
| 7,937,268 B2 * | 5/2011 | Kirkland et al. | ........... | 704/235 |
| 7,945,621 B2 * | 5/2011 | Yuan et al. | ........... | 709/204 |
| 7,949,118 B1 * | 5/2011 | Edamadaka et al. | ..... | 379/202.01 |
| 7,961,851 B2 * | 6/2011 | Bran et al. | ........... | 379/88.14 |
| 8,090,580 B2 * | 1/2012 | Schmidt et al. | ........... | 704/235 |
| 2005/0069095 A1 * | 3/2005 | Fellenstein et al. | ........... | 379/88.02 |

OTHER PUBLICATIONS

Whittaker et al., "Jotmail: a voicemail interface that enables you to see what was said," CHI Letters, vol. 2, Issue 1, pp. 89-96, Apr. 2000.
Business Editors & High Tech Writers, "If Email is a Sticky Application . . . Then ThinkLink is Superglue; UPSIDE Magazine Names ThinkLink Among the Hot 100 Private Companies for 2000," San Francisco—(Business Wire), 2 pages, May 23, 2000.
Novell Cool Solutions Trench, "Getting Voicemail in your GroupWise Client," 2 pages, Dec. 18, 2002.

\* cited by examiner

*Primary Examiner* — Joseph T Phan
(74) *Attorney, Agent, or Firm* — Baker Botts L.L.P.

(57) ABSTRACT

A method is provided for playing one or more key portions of a voice communication. The method includes storing, in a memory, a communication that includes one or more speech signals and a tag identifying a key portion of the one or more speech signals. The communication and the tag are retrieved from the memory. The key portion of the communication identified by the tag is played for a first end user.

28 Claims, 3 Drawing Sheets

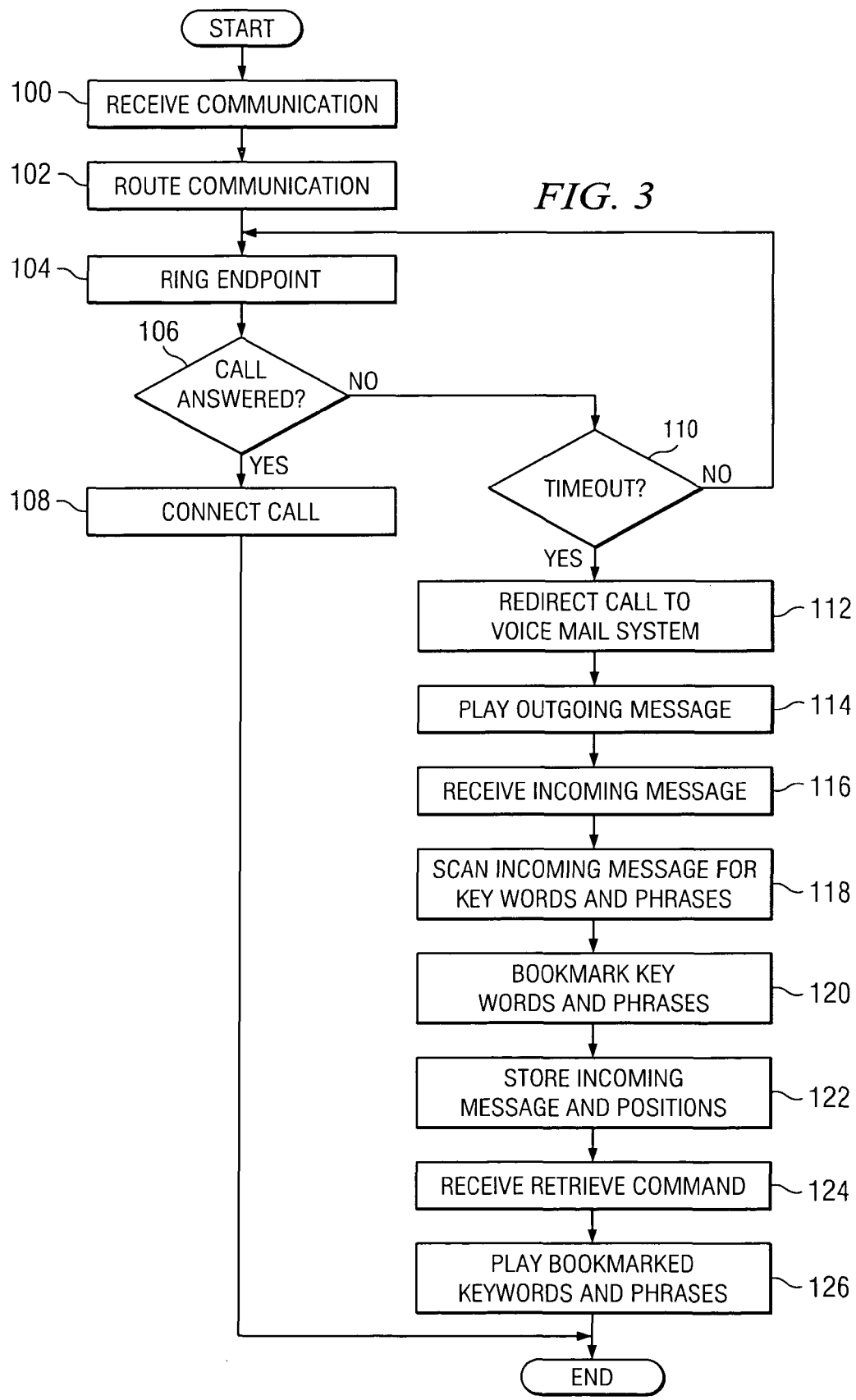

United States Patent US 8,233,597 B2

SYSTEM AND METHOD FOR THE PLAYING OF KEY PHRASES IN VOICE MAIL MESSAGES

TECHNICAL FIELD OF THE INVENTION

This invention relates generally to the field of messaging, and more specifically to a system and method for the playing of key phrases in voice mail messages.

BACKGROUND OF THE INVENTION

A voice mail system linked to a communication system typically provides voicemail services for telephony devices and users serviced by the system. Generally, if a user fails to answer a call after a predetermined number of rings, a call manager will forward the call to the voice mail system. The voice mail system, upon receiving a message for the user, will inform the network, which in turn informs a telephony device associated with the user to provide a message waiting indication, such as a blinking light or pulsed dial tone on the telephony device. A user of the telephony device may then retrieve the voice message using the telephony device or another endpoint in the system.

Often important key phrases in the message, such as phone numbers and dates, are missed during the first retrieval of the message. As a result, the user must replay the message in its entirety to rehear those portions of the message that are particularly noteworthy. Prior systems allow users limited playback capabilities for skipping through a voice mail message. For example, some systems may allow a user to manually skip through the voice mail message at n-second intervals. Other systems may allow a user to replay the message in its entirety and adjust the speed of the voice mail delivery.

SUMMARY OF THE INVENTION

The present invention provides a method and system for the bookmarking of key words, phrases, and other patterns in voice mail messages to provide for the automated or user activated replay of those key phrases that substantially eliminates or reduces at least some of the disadvantages and problems associated with previous methods and systems.

In accordance with a particular embodiment of the present invention, a method is provided for playing one or more key portions of a voice communication. The method includes storing, in a memory, a communication that includes one or more speech signals and a tag identifying a key portion of the one or more speech signals. The communication and the tag are retrieved from the memory. The key portion of the communication identified by the tag is played for a first end user.

Certain embodiments of the present invention may provide a number of technical advantages. For example, according to one embodiment of the present invention, an architecture and process are provided that enable the play back of key portions of a voice mail message. As a result, the portions of a voice mail message, which a user may likely deem important, are identified and played for the end user. In particular embodiments, the play back of the key portions may be automated such that the key portions are played before or after the entire voice mail message without requiring further user interaction. Accordingly, users that receive lengthy or important voice mail messages that require note taking may be given an additional opportunity to hear key portions of the voice mail message without requiring that the end user listen to the entire message a second time. Where the play back of the key portions is automatic, no further interaction from the user may be required. In other embodiments, the play back of the key portions may be user directed. Accordingly, the play back may be affected upon the receipt of a user command.

As another advantage, an architecture and process are provided that provides for the playback of the key portions at a slower speed than a recorded speed. Accordingly, portions of the voice mail message that a user may deem as important, such as call return information, phone numbers, dates, and times, may be played for the user at a speed that is slower than that which it was recorded at. As a result, the end user receiving the voice mail message may be given more time to write down the key portions of the voice mail message.

As still another advantage, an architecture and process are provided that use existing speech recognition technology to improve voice mail services. Speech recognition technology has limited capabilities for generating reliable text conversions of voice mail messages. The disclosed architecture and system, however, use speech recognition technology to identify the presence of and location of key words, phrases, and patterns in a speech string rather than to provide reliable verbatim text conversions of those key words, phrases, and patterns. Furthermore, because the positions of the key phrases are pinpointed within the audio string, the replay of the key phrases is more efficient than prior voice mail systems that allow a user to manually skip through the voice mail message at n-second intervals to adjust the speed of voice mail delivery.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages, reference is now made to the following description, taken in conjunction with the accompanying drawings, in which:

FIG. 3 is a flowchart illustrating a method for handling a received and unanswered communication that includes the playing of selected portions of voice mail message.

DETAILED DESCRIPTION OF THE INVENTION

Figure 1:
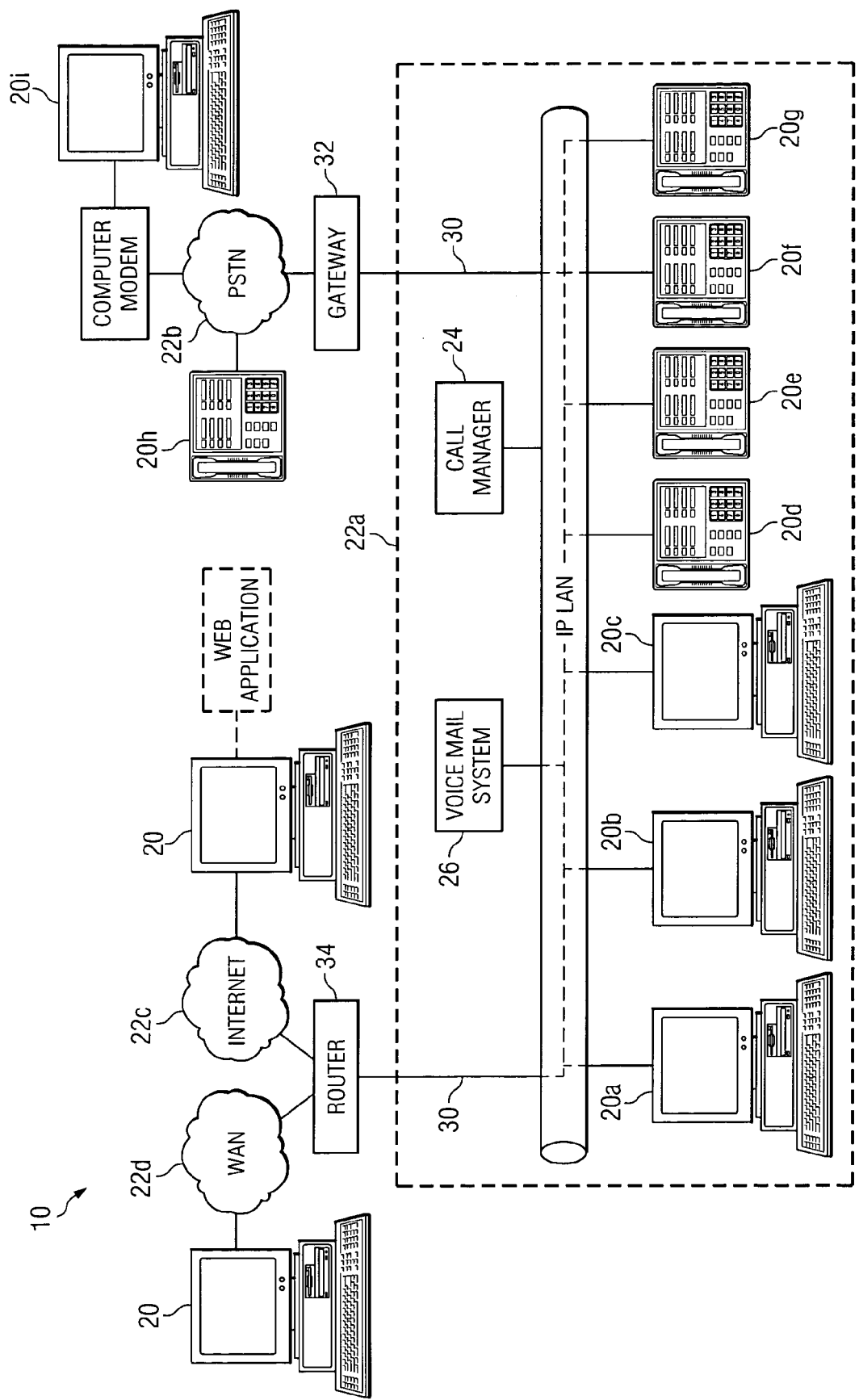
FIG. 1 illustrates a communication network in accordance with a particular embodiment of the present invention.

FIG. 1 illustrates a communications system 10 for providing the playing of key phrases in a voice mail message. System 10 includes a plurality of endpoints 20 having the ability to establish communication sessions between each other, using one or more of communication networks 22a-22d. System 10 also includes one or more call managers 24 that cooperate with a voice mail system 26 to manage incoming calls and other communications for endpoints 20. In particular embodiments, call manager 24 may intercept an incoming call or other communication that is directed at an endpoint 20 if that call goes unanswered for some predetermined amount of time. Call manager 24 may then forward the incoming call to voice mail system 26, which operates to record a voice mail message from the incoming caller and store that voice mail message in a database. In particular embodiments a speech-recognition engine may be used to scan the voice mail message for numbers, dates, and other key phrases. The key portions of the voice mail message may be bookmarked such that the when the recipient of the incoming call retrieves the voice mail message, the bookmarked key portions may be played for the user's convenience.

In the illustrated embodiment, system 10 includes a local area network (LAN) 22a, a Public Switched Telephone Network (PSTN) 22b, a public network 22c, and a wide area network (WAN) 22d, which cooperate to provide communication services to the variety of types of endpoints 20 within system 10. Specifically, LAN 22a couples multiple endpoints 20a-20g for the establishment of communication sessions between endpoints 20a-20g and other endpoints 20 distributed across multiple cities and geographic regions.

Generally, LAN 22a provides for the communication of packets, cells, frames, or other portions of information (generally referred to as packets herein) between endpoints 20. Accordingly, LAN 22a may include any combination of network components, gatekeepers, call managers, routers, hubs, switches, gateways, endpoints, or other hardware, software, or embedded logic implementing any number of communication protocols that allow for the exchange of packets in communication system 30. In the illustrated embodiment, LAN 22a includes a plurality of segments 30 that couple endpoints 20a-20g with call manager 24, voice mail system 26, gateway 32, router 34, and communication networks 22b-22d. Specifically, segments 30 couple endpoints 20a-20g with PSTN 22b, Internet 22c, and WAN 22d to allow communication with various devices located outside of LAN 22a. Because both audio and/or video telecommunication signals may be communicated over LAN 22a, LAN 22a may eliminate the need, in certain embodiments, for a separate telephone network, such as a private branch exchange (PBX), to provide telecommunication services within a business or other organization.

Although the illustrated embodiment includes four communication networks 22a-22d, the configuration of networks 22a-22d are provided as merely one example configuration of a system 10 for establishing communication sessions between and among system components. The term "communication network" should be interpreted as generally including any network capable of transmitting audio and/or video telecommunication signals, data, and/or messages, including signals, data, or messages transmitted through text chat, instant messaging, and e-mail. Any one of networks 22a-22d may be implemented as a local area network (LAN), wide area network (WAN), global distributed network such as the Internet, Intranet, Extranet, or any other form of wireless or wireline communication network. It is generally recognized that system 10 may include any combination of networks and that system 10 may include fewer or more networks 22a-22d as is required by the number of endpoints 20 or the desired traffic across system 10.

In a particular embodiment, communication network 34a employs voice communication protocols that allow for the addressing or identification of endpoints, nodes, and/or call managers coupled to communication network 34a. For example, LAN 20 may be an Internet Protocol (IP) network or any other type of network that allows each of the components coupled together by LAN 22a in communication system 10 to be identified using IP addresses. IP networks transmit data (including telecommunication signals) by placing the data in packets and sending the packets individually to the selected destination. This may be referred to as a packet network. Other types of packet networks include ATM, Frame Relay, Ethernet, SNA, and SONET networks, among others.

Unlike a circuit-switched network (e.g., PSTN 22b), dedicated bandwidth is not required for the duration of a communication session over LAN 22a. Instead, each endpoint sends packets as they become available for transmission. In this manner, network 34a may support any form and/or combination of point-to-point, multicast, unicast, or other techniques for exchanging media packets among components in communication system 10. Any network components capable of exchanging audio, video, or other data using frames or packets, are included within the scope of the present invention.

The technology that allows communication signals to be transmitted over an IP network may be referred to as Voice over IP (VoIP). In particular embodiments, one or more of endpoints 20a-20g may include an IP telephony device. IP telephony devices have the capability of encapsulating a user's voice (or other inputs) into IP packets so that the voice can be transmitted over LAN 22a (as well as Internet 22c and WAN 22d, which may also be packet networks). IP telephony devices may include telephones, fax machines, computers running telephony software, and any other devices capable of performing telephony functions over an IP network.

Call manager 24 controls IP telephony devices within LAN 22a. Call manager 24 is an application that controls call processing, routing, telephony device features and options (such as call hold, call transfer and caller ID), device configuration, and other telephony functions and parameters within communications system 10. When a user wishes to place a call from one telephony device, such as endpoint 20d, to another telephony device, such as endpoint 20e, on LAN 22a, the calling device transmits signaling to call manager 24 indicating the desired function and destination. Call manager 24 then instructs endpoints 20d and 20e to establish a network connection between themselves over LAN 22a.

Once endpoints 20d and 20e have established a connection, a codec (coder/decoder) converts the voice or other telecommunication signals generated by the users of endpoints 20d and 20e from analog signals into digital form. Endpoints 20d and 20e may implement the codec either in software or as special-purpose hardware. For example, for a voice communication sent from endpoint 20d to endpoint 20e, the codec in endpoint 20d digitizes the outgoing telecommunication signals. Endpoint 20d then encapsulate the digital data within IP packets so that it can be transmitted over LAN 22a. This encapsulation is typically performed by Real-Time Transport Protocol (RTP) running over UDP/IP (User Datagram Protocol/Internet Protocol). The encapsulation process is well-known in the art, and will not be described in further detail. The IP packets are then transported over LAN 22a via the IP protocol to endpoint 20e and other endpoints 20 participating in the call. A codec in the receiving endpoint 20e then translates the IP packet data into analog voice signals for presentation to the user. This process is repeated each time that a call participant (or other source) generates telecommunication signals.

In addition to intra-LAN telephone calls, calls can also be placed to non-IP telephony devices, such as endpoint 20h, that are connected to PSTN 22b. PSTN 22b includes switching stations, central offices, mobile telephone switching offices, pager switching offices, remote terminals, and other related telecommunications equipment that are located throughout the world. Calls placed to endpoint 20h are made through VoIP-to-PSTN gateway 32. Gateway 32 converts analog or digital circuit-switched data transmitted by PSTN 22b (or a PBX) to packet data transmitted by LAN 22a, and vice-versa. Gateway 32 also translates between the VoIP call control system and the Signaling System 7 (SS7) or other protocols used in PSTN 22b. For example, when making a call to a PSTN endpoint 20h from an IP endpoint 20d, the telecommunication signal generated by the user of IP endpoint 20d is digitized and encapsulated, as described above. The packets are then transmitted over LAN 22a to gateway 32. Gateway 32 converts the data in the packets to the format (either digital or analog) used by PSTN 22b. The voice signals are then sent to the PSTN endpoint 20h over PSTN 22b. This process is continued between LAN 22a and PSTN 22b through gateway 32 until the call is complete.

Calls also may be made between IP telephony devices, such as endpoint 20d, and other IP telephony devices located on Internet 22c or across WAN 22d. Again, the telecommunication data is digitized and encapsulated into IP packets at the telephony device. However, unlike communications with devices on PSTN 22b, a gateway is not needed to convert the IP packets to another format. A router 34 (or other similar device such as a hub or bridge) directs the packets to the IP address of the receiving IP telephony device.

In the illustrated embodiment, LAN 22a includes a voice mail system 26 that operates in conjunction with the endpoints 20a-20g coupled to LAN 22a to receive and store voice mail messages for users of endpoints 20a-20g, as well as for certain remote devices located outside of LAN 22a. Although illustrated as a dedicated network device, the software, firmware and/or hardware used to implement voice mail system 26 may be incorporated into one or more devices on LAN 22a, including call manager 24. Voice mail system software may be embodied in any type of computer-readable medium.

In an example scenario, a first end user may be associated with a first endpoint 20d, which comprises a telephony device, and a second end user may be associated with a second endpoint 20e, which comprises a telephony device. To initiate a communication session, the first end user may use first endpoint 20d to call the second end user at second endpoint 20e. Where the second end user is participating in a previous call or is otherwise unavailable to take the incoming call from the first end user, call manager 24 may intervene by intercepting the call and forwarding it to voice mail system 26. Voice mail system 26 may answer the call and provide an appropriate message to the second end user requesting that the second end user leave a voice mail message.

As will be described in more detail below, the voice mail message received from the second end user may be scanned for numbers, dates, or other key words, phrases, or patterns. The key words may then be tagged such that their location in the voice mail message is stored. When the first end user retrieves the voice mail message from voice mail system 26, he tagged portions of the voice mail message may be played for first end user. In particular embodiments, the tagged portions may be reiterated before or after the voice message is played in its entirety. Accordingly, the key portions of a voice mail message may be played a second time so that the first end user has a second opportunity to hear and take note of noteworthy portions of the voice mail message. In other embodiments, merely the tagged portions may be played for the end user. As will be described in more detail below, the playing of the tagged portions may be at first user's direction or may be automatic.

Figure 2:
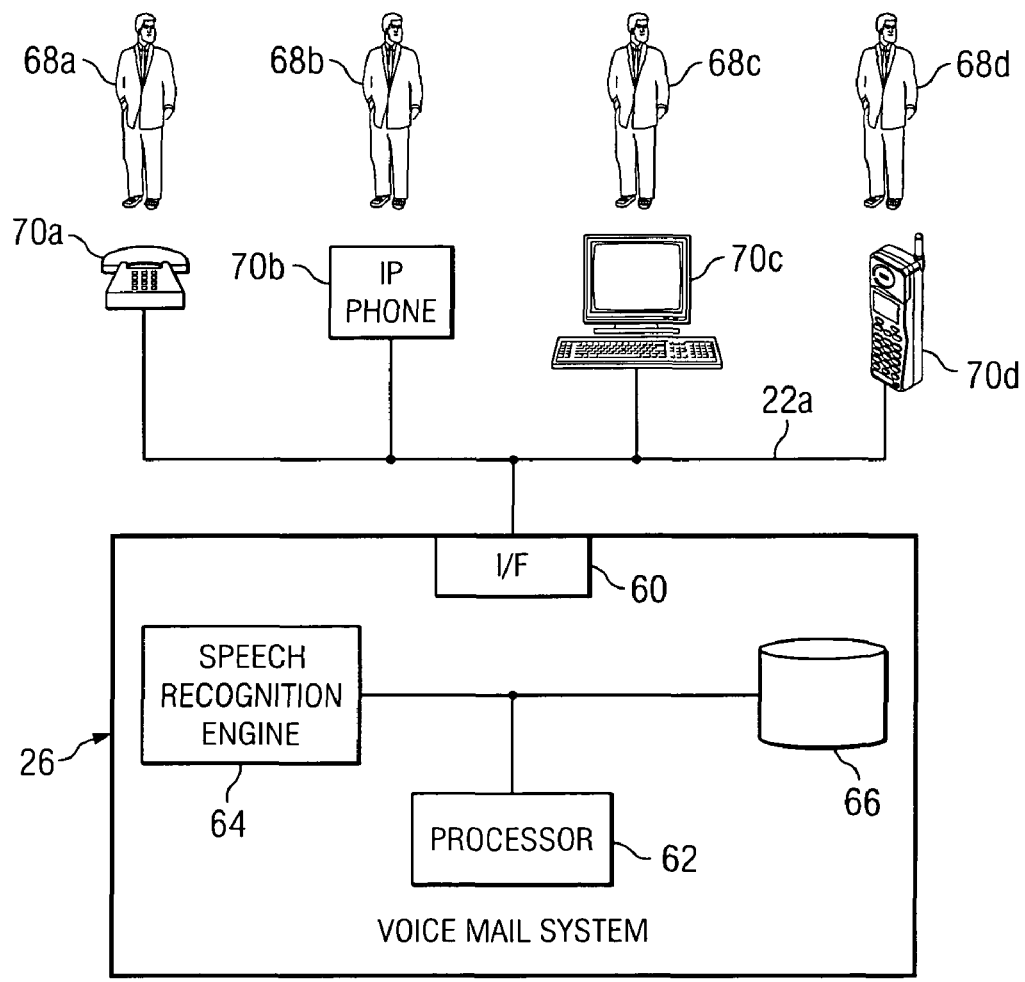
FIG. 2 illustrates a voice mail system in more detail, in accordance with a particular embodiment of the present invention.

FIG. 2 illustrates voice mail system 26 in more detail, in accordance with a particular embodiment of the present invention. Voice mail system 26 includes an interface 60, a processor 62, a speech recognition engine 64, and a memory 66. In general, processor 62, memory 66, and speech recognition engine 64 may operate to store voice mail messages for a number of end users 68 associated with endpoints 70. Bookmarked portions of those voice mail messages, which may be especially important or noteworthy to the user, may be played automatically or at the user's direction.

In particular embodiments, processor 62 may be a microprocessor, controller, or any other suitable computing device or resource. Processor 62 operates to receive and process voice mail messages intended for end users 68 associated with endpoints 70. During the processing of voice mail messages, processor 62 sends information to and receives information from speech recognition engine 64. Processor 62 also operates to store information in and retrieve information from memory 66, which may include any form of volatile or non-volatile memory including, without limitation, random access memory (RAM), read-only memory (ROM), removable media, or any other suitable local or remote memory component. In particular embodiments, memory 66 may include a queue of voice mail messages for each end user 68 associated with voice mail system 26.

Speech recognition engine 64 may be any combination of hardware, software and/or encoded logic, that operates to receive and process speech signals from processor 62. Where the received signals are analog signals, speech recognition engine 64 may include a voice board that provides analog-to-digital conversion of the speech signals. A signal processing module may then take the digitized samples and convert them into a series of patterns. The patterns may then be compared to a set of stored modules that have been constructed from the knowledge of acoustics, language, and dictionaries.

In particular embodiments, speech recognition engine 64 may use isolated word and phrase recognition to recognize a discrete set of command words, phrases, or patterns. Additionally or alternatively, speech recognition engine 64 may use key word spotting to pick out key words and phrases from among a sentence of extraneous words. For example, speech recognition engine 64 may use key word spotting to identify strings of numerals, times, and/or dates. Speech recognition engine 64 may then bookmark the key words, phrases, and patterns by storing offset positions of those key words and phrases in memory 66. In particular embodiments, an offset position may identify the location in the voice mail message that corresponds with the beginning of the key word or phrase. For example, the offset position may identify an amount of time, in milliseconds, that is measured from the beginning of the voice mail message. Additionally or alternatively, the offset position may identify an ending position of the key portion, or an amount of time associated with the key portion.

In particular embodiments, a first end user 68a, who is associated with endpoint 70a, may call a second end user 68b, who is associated with endpoint 70b. If second end user 68b is on a previous call or is otherwise unavailable when the call from first end user 68a is received, the call is directed to voice message system 26, where it is received by processor 62 through interface 60. If first end user 68a chooses to leave a voice mail message for second end user 68b, processor 62 stores the voice mail message in memory 66. Processor 62 also transmits the voice mail message to speech recognition engine 64, which scans the voice mail message to identify key words, phrases, and numerals.

For example, if the voice mail message includes a string of numerals such as "555-1212", speech recognition engine 64 may perform a scan of the voice mail message and identify the occurrence of this string numerals. Furthermore, if the string of numerals occurs 2500 milliseconds into the voice mail message, speech recognition engine 64 may note the offset position of this string of numerals as 2500 milliseconds. Assume further for example purposes that it takes first end user 68a 1000 milliseconds to speak the string of numerals. In particular embodiments, speech recognition engine 64 may also store the duration of time associated with the speaking of the string of numerals (i.e., 1000 milliseconds) or an ending offset position corresponding with the end of the string of numerals (i.e., 3500 milliseconds).

As described above, the voice mail message and the bookmarked offset position may be stored in memory 66. In particular embodiments, the voice mail message and bookmarked offset position, or tags, may be stored in a queue with other voice mail messages and associated tags received for second end user 62b. The voice mail message may remain in memory 66 until processor 62 receives a command from second end user 62b that requests the retrieval of any stored voice mail messages. Upon receiving such a command, processor 62 may retrieve the voice mail message and the tags associated with the voice mail message from memory 66. Processor 62 may then transmit the voice mail message and tags to an endpoint associated with the recipient of the voice mail message for playback.

In one example scenario, processor 62 may automatically replay the tagged portions of the voice mail message. The automated playing of the tagged portions of the voice mail message may occur before the voice mail message is played in full. Alternatively, the tagged portions of the voice mail message may be replayed after the voice mail message is played in full. For example, if the voice mail message states, "This is Bob. Please call me at 555-1212 some time this evening," the portion "555-1212" may be tagged for automatic replay. Accordingly, the following message may be automatically played for second end user 68b:

This is Bob. Please call me at 555-1212 some time this evening. 555-1212.

Where the replaying of the tagged portion is automatic, no additional interaction from second end user 68b may be required. Thus, after pushing the appropriate buttons on endpoint 70b to effect the retrieval of the voice mail message, second end user 62b need not push any additional buttons on endpoint 70b to cause the replaying of the key portion at the end of the voice mail message.

Although the described example includes the identification and bookmarking of a string of numerals, it is generally recognized that any phrase or series of speech patterns corresponding to a set of stored modules may be processed similarly. For example, speech recognition engine 64 may additionally or alternatively operate to identify and bookmark dates and/or times. Thus, if a recorded voice mail message states, "This is Bob. I'm coming into town on Tuesday, January 11, and look forward to our meeting at 3:00 p.m. Please call me at 555-1212 this evening to confirm," the following message may be automatically played the receiving end user 68:

This is Bob. I'm coming into town on Tuesday, January 11, and look forward to our meeting at 3:00 p.m. Please call me at 555-1212 some time this evening to confirm. Tuesday. January 11. 3:00 p.m. 555-1212.

In this example, speech recognition engine 64 has captured the most important portions of the voice mail message and has automatically repeated those portions for the end user 68.

As described above, the tagged portions of the voice mail message are played automatically without further interaction from second end user 68. It is generally recognized, however, that the tagged portions of the voice mail message may be played for second end user 68b when processor 62 receives a command from second end user 68b. Depending upon the particular implementation, the command from second end user 68b may include the pressing of a specified key on endpoint 70b. In particular embodiments, voice mail system 26 may recognize Dual Tone, Multi-Frequency commands that correspond generally with the numbers 0-9, "*", and "#."

For example, voice mail system 26 may request that second end user 68b press "5" on endpoint 70b if second end user 68b desires to hear tagged portions of the voice mail message played a second time. Such an offering to play key portions of the voice mail message may be made before the voice mail message is played in its entirety for second end user 68b. Alternatively, such an offering may be made at the conclusion of the playing of the entire voice mail message.

In another example scenario, the command received from second end user 68b may include a spoken word or phrase uttered by second end user 68b during the retrieval process. For example, voice mail system 26 may request that second end user 68b say "replay" if second end user 68b desires to hear tagged portions of the voice mail message played a second time. Where voice mail system 26 includes Automatic Speech Recognition (ASR) capabilities, different tagged portions of the voice mail message may be replayed for second end user 62b depending upon the command spoken. Thus, if second end user 62b desires to hear a phone number within the voice mail message replayed, second end user 62b may say "phone number" at the appropriate time. Alternatively, if second end user 62b desires to hear a date within the voice mail message replayed, second end user 62b may say "date." Voice recognition technology may be used by processor 62 and speech recognition engine 64 to identify the command spoken by second end user 68b and to identify the tagged portion that should be replayed.

In still another example scenario, a user may opt to hear only the tagged portions of the voice mail message rather than hearing the entire voice mail message. For example, if the voice mail message states, "This is Bob. Please call me at 555-1212 some time this evening," the portion "555-1212" may be tagged as a key portion. When second end user 68b retrieves his messages, however, an option may be given to second end user 68b that results in only the key portion being played back to second end user 68b. As a result of selecting this option, the following message may be played for second end user 68b:

555-1212.

Thus, second end user 68b may forego hearing the entire voice mail message in favor of hearing only those portions that are deemed by processor 62 to be key portions of significant interest to second end user 68b.

It is readily apparent that such a system is especially helpful to end users 68 that receive lengthy voice mail messages that require note taking. Additionally, an end user 68 who isn't ready with a pencil when the voice mail message is initially retrieved, can gather a pencil and paper as the voice mail message is being played with the knowledge that the tagged portions will be repeated at the end of the message. Furthermore, because only the identified and bookmarked portions of the voice mail message are repeated, the end user 68 receiving the voice mail message need not listen to the entire message a second time to hear the key portions of the voice mail message repeated. Even further, where the playing of the tagged portions of the voice mail message is independent of the playing of the entire message, it is contemplated that the end user 68 need not listen to the entire message at all. Rather, the end user 68 may opt to hear only those portions of the voice mail message that are tagged as being of particular interest.

As another advantage, voice mail system 26 uses existing speech recognition technology to improve voice mail services. As described above, it is generally recognized that, to date, speech recognition technology has many short comings that prevent the reliable conversion of voice mail messages to text messages. For example, if in his voice mail message to second end user 68*b*, first end user 68*a* rattles off the return number "555-1212", existing speech recognition technology may only detect "5512-2." However, voice mail system 26 uses speech recognition technology to identify the presence of and location of key portions in a speech string rather than to provide reliable verbatim text conversions of those key portions. Furthermore, because the positions of the key portions are pinpointed within the audio string, the replay of the key portions is more efficient than prior systems that allow the end user to manually skip through the voice mail message at n-second intervals.

As still another advantage, particular embodiments of the present invention, may result in the playing of the tagged portions of the voice mail message at a speed that is slower than a recorded speed. For example, when leaving the initial voice mail message for second end user 68*b*, first end user 68*a* may speak very quickly while reciting the number that second end user 68*b* should use to return the call. Often, end users speak their own phone numbers very quickly since they are reciting them from memory. Voice mail system 26, however, may tag the call back phone number within the voice mail message. Upon play back by second end user 68*b*, voice mail system 26 may use pitch-correct speed control to slow down the play back speed of the tagged portions to improve end user comprehension and transcription.

In still another embodiment, voice mail system 26 may use one or more tagged portions of a voice mail message to identify the subject of the voice mail message to second end user 68*b* before play back of the message. One or more tagged portions may then be played to second end user 68*b* before the full message is played. For example, upon retrieving his voice mail messages from voice mail system 26, second end user 68*b* might hear "call from" followed by a tagged phone number phrase. Where the tagged "subject" portion of the voice mail message is played before the message is played in its entirety, the tagged portion may operate as an introduction to the voice mail message. The subject portion may then be used by second end user 68*b* to identify the source of the voice mail message and/or the location of first end user 68*a*. Second end user 68*b* may use this information when determining whether or not second end user 68*b* desires to listen to the voice mail message in its entirety.

Additionally, it will be recognized by those of ordinary skill in the art that voice mail system 26 is merely one example configuration of a voice mail system for handling and managing incoming calls to end users in communication system 10. Accordingly, it is generally recognized that voice mail system 10 may include any number of processors, engines, queues, or memory modules to accomplish the functionality, features, and advantages described herein. Furthermore, processor 62, memory 66, and/or speech recognition engine 64 associated with voice mail system 26 may be centrally located (local) with respect to one another, or distributed throughout the associated communication network.

FIG. 3 is a flowchart illustrating a method for handling a received and unanswered communication that includes the automatic replaying of tagged portions of voice mail message. The method begins at step 100 when a communication is received by a call manager 24 or other network device. Continuing with the example scenario described above, the communication may be received from a first end user 68*a* associated with first endpoint 70*a* and may be directed to a second end user 68*b* associated second endpoint 70*b*.

At step 102, call manager 24 routes the incoming call to second endpoint 70*b*. Upon receiving the incoming call, second endpoint 70*b* may be rung or otherwise notified of the incoming call at step 104. A determination is then made at step 106 as to whether second endpoint 70*b* has answered the incoming call. If the call has been answered, the call is connected to second endpoint 70*b* at step 108 and the method terminates. For example, using appropriate signaling, second endpoint 70*b* may communicate an off-hook indication to call manager 24, and in response, call manager 24 may open the voice channel to second endpoint 70*b*.

If it is determined that the call has not been answered, however, a further determination may be made at step 110 to identify whether a timeout has occurred with respect to the call. In particular embodiments, the call may time out after a specified duration or a specified number of rings. For example, the call may time out after second endpoint 70*b* is rung for twenty seconds and remains unanswered. As another example, the call may time out after five rings if the call remains unanswered. If the call has not timed out, the method returns to step 104 where the extension associated with second endpoint 70*b* is continually rung until it is either answered and connected or a time out has occurred.

Upon the determination at step 110 that a time out has occurred, call manager 24 redirects the call to voice mail system 26 at step 112. Voice mail system 26 plays an outgoing message to first end user 68*a* at step 114. In particular embodiments, the outgoing message identifies the unavailability of second end user 68*b* and invites first end user 68*a* to leave a voice mail message for second end user 68*b*. If first end user 68*a* leaves such a voice mail message, voice mail system 26 receives the incoming voice mail message at step 116.

At step 118, speech recognition engine 64 scans the incoming voice mail message for key words and phrases. Where appropriate, speech recognition engine 64 may convert the incoming voice mail message from an analog format to a digital format. The voice mail message may then be converted into a series of patterns that may be compared to a set of stored modules that include key words, phrases, numerals, or letters. In particular embodiments, speech recognition engine 64 may additionally or alternatively use isolated word and phrase recognition or key word spotting to identify any key words and phrases within a speech string of extraneous words.

The identified key words and phrases are bookmarked, or tagged, at step 120. In particular embodiments, and as described in more detail above, the key words and phrases may be tagged by identifying offset positions that correspond with the locations of the key words and phrases in the incoming voice mail message.

At step 122, the voice mail message and any tags are stored in memory 66 or another network database. The voice mail message and the tags may remain in memory 66 until a retrieve messages command is received from second end user 68*b* at step 124. Upon receiving such a command, the voice mail message may be retrieved from memory 66. The tagged portions may then be played for second end user 68*b* at step 126. As described above, the playing of the tagged portions of the voice mail message may occur before or after the voice mail message is played in full or independent of the voice mail message altogether. Additionally, the playing of the tagged portions may occur automatically with no additional interaction from second end user 68*b* required or after a command is received from second end user 68*b* that requests that the tagged portions be played or replayed. In particular embodiments, the tagged portions may be played to second end user 68*b* at a speed that is slower than the recorded speed. As a result, comprehension of the tagged portions by second end user 68*b* may be improved.

Thus, the flowchart and preceding description outline the operation of voice mail system 26 in providing the automated or user-requested playing of key portions of a voice mail message. However, it is generally recognized that some of the steps illustrated in FIG. 3 may be combined, modified or deleted where appropriate, and additional steps may also be added to the flowchart. The flowchart and accompanying description illustrate only one exemplary method of operation. Any suitable techniques and elements for operating as a server or client to support centralized voicemail services in a distributed call management environment may be used. Thus, many of the steps in this flowchart may take place simultaneously and/or in different orders than as shown. Furthermore, although the present invention has been described in detail with reference to particular embodiments, it should be understood that various other changes, substitutions, and alterations may be made hereto without departing from the spirit and scope of the present invention. For example, although the present invention has been described with reference to a number of elements included within a communication system, these elements may be combined, rearranged or positioned in order to accommodate particular routing architectures or needs. In addition, any of these elements may be provided as separate external components to a communication system or to each other where appropriate. The present invention contemplates great flexibility in the arrangement of these elements as well as their internal components.

What is claimed is:

1. A method for playing one or more key portions of a voice communication, comprising:
   storing a communication comprising one or more speech signals in a memory;
   using a speech recognition engine to scan the communication and identify a key portion of the one or more speech signals, the key portion comprising a series of patterns in the communication that are recognized by the speech recognition engine;
   storing a tag identifying the key portion;
   retrieving the communication and the tag from the memory;
   in response to receiving a request to play the communication, playing the communication in its entirety for a first end user, wherein while playing the communication in its entirety the at least one key portion is played a first time for the first end user; and
   after playing the communication in its entirety to the first end user and without requiring any further interaction from the first end user, automatically and immediately playing the key portion of the communication identified by the tag for a second time for the first end user such that the communication is not replayed in its entirety.

2. The method of claim 1, wherein the communication comprises a voice mail message.

3. The method of claim 2, wherein the key portion is selected from a group consisting of call back information, a number, a string of numbers, a date, or a time.

4. The method of claim 1, further comprising:
   receiving the communication from a second end user;
   scanning the communication to identify the key portion of the speech signals; and
   associating the tag with the key portion of the speech signals.

5. The method of claim 4, wherein the communication is received from a non-IP telephony device in an analog format and the method further comprising:
   converting the one or more speech signals from the analog format to a digital format to result in one or more digitized speech signals;
   converting the digitized speech signals to a series of patterns; and
   comparing the series of patterns to a set of stored modules to identify the key portion of the speech signals.

6. The method of claim 1, wherein storing the tag identifying the key portion comprises storing a starting position of the key portion of the speech signals within the communication.

7. The method of claim 6, wherein storing the tag identifying the key portion further comprises storing an ending position of the key portion of the speech signals within the communication.

8. The method of claim 6, wherein storing the tag identifying the key portion further comprises storing an amount of time associated with the key portion of the speech signals, the amount of time measured from the beginning of the key portion to the ending of the key portion.

9. A method for playing one or more key portions of a voice communication, comprising:
   storing a communication comprising one or more speech signals in a memory;
   using a speech recognition engine to scan the communication and identify a key portion of the one or more speech signals, the key portion comprising a series of patterns in the communication that are recognized by the speech recognition engine;
   storing a tag identifying the key portion;
   retrieving the communication and the tag from the memory;
   playing only the key portion of the communication identified by the tag for a first end user such that the communication is not played in its entirety; and
   after playing only the key portion of the communication to the first end user and without requiring any further interaction from the first end user, automatically and immediately playing the communication in its entirety for the first end user after playing only the key portion of the communication.

10. The method of claim 1, further comprising:
    receiving a command from the first end user; and
    playing the key portion of the communication in response to receiving the command.

11. The method of claim 1, wherein playing the key portion of the communication comprises playing the key portion at a speed that is slower than a recorded speed.

12. A system for playing one or more key portions of a voice communication, comprising:
    a memory operable to store:
        a communication comprising one or more speech signals; and
        a tag identifying a key portion of the one or more speech signals; and
    a processor in communication with the memory and operable to:
        use a speech recognition engine to scan the communication and identify the key portion of the one or more speech signals, the key portion comprising a series of patterns in the communication that are recognized by the speech recognition engine;
        tag key portion to identify the location of the key portion in the communication;
        retrieve the communication and the tag from the memory;

in response to receiving a request to play the communication, play the communication in its entirety for a first end user, wherein while playing the communication in its entirety the at least one key portion is played a first time for the first end user; and after playing the communication time to the first end user and without requiring any further interaction from the first end user, automatically and immediately play the key portion of the communication identified by the tag for a second time for the first end user such that the communication is not replayed in its entirety.

13. The system of claim 12, wherein the communication comprises a voice mail message.

14. The system of claim 13, wherein the key portion is selected from a group consisting of call back information, a number, a string of numbers, a date, or a time.

15. A system for playing one or more key portions of a voice communication, comprising:
 a memory operable to store:
  a communication comprising one or more speech signals; and
  a tag identifying a key portion of the one or more speech signals; and
 a processor in communication with the memory and operable to:
  receive the communication from a second end user;
  scan the communication to identify the key portion of the speech signals;
  associate the tag with the key portion of the speech signals;
  retrieve the communication and the tag from the memory;
  in response to receiving a request to play the communication, play the communication in its entirety for a first end user, wherein while playing the communication in its entirety the at least one key portion is played a first time for the first end user; and
  after playing the communication in its entirety to the first end user and without requiring any further interaction from the first end user, automatically and immediately play the key portion of the communication identified by the tag for a second time for the first end user such that the communication is not replayed in its entirety.

16. The system of claim 15, wherein the communication is received from a non-IP telephony device in an analog format and wherein the processor is further operable to:
 convert the one or more speech signals from the analog format to a digital format to result in one or more digitized speech signals;
 convert the digitized speech signals to a series of patterns; and
 compare the series of patterns to a set of stored modules to identify the key portion of the speech signals.

17. The system of claim 12, wherein the processor is further operable to store the tag identifying the key portion by storing a starting position of the key portion of the speech signals within the communication.

18. The system of claim 17, wherein the processor is further operable to store the tag identifying the key portion by storing an ending position of the key portion of the speech signals within the communication.

19. The system of claim 17, wherein the processor is further operable to store the tag identifying the key portion by storing an amount of time associated with the key portion of the speech signals, the amount of time measured from the beginning of the key portion to the ending of the key portion.

20. The system of claim 12, wherein the processor is further operable to play the communication in its entirety for a first end user after playing the key portion of the communication.

21. The system of claim 12, wherein the processor is further operable to:
 receive a command from the first end user; and
 play the key portion of the communication in response to receiving the command.

22. The system of claim 12, wherein the processor is further operable to play the key portion at a speed that is slower than a recorded speed.

23. A system for playing one or more key portions of a voice communication, comprising:
 means for storing a communication comprising one or more speech signals in a memory;
 means for using a speech recognition engine to scan the communication and identify a key portion of the one or more speech signals, the key portion comprising a series of patterns in the communication that are recognized by the speech recognition engine;
 means for storing a tag identifying the key portion;
 means for retrieving the communication and the tag from the memory; and
 in response to receiving a request to play the communication, means for playing the communication in its entirety for a first end user, wherein while playing the communication in its entirety the at least one key portion is played a first time for the first end user; and
 after playing the communication in its entirety to the first end user and without requiring any further interaction from the first end user, means for automatically and immediately playing the key portion of the communication identified by the tag for a second time for the first end user such that the communication is not replayed in its entirety.

24. A tangible non-transitory machine-readable medium comprising logic operable to:
 store a communication comprising one or more speech signals in a memory;
 use a speech recognition engine to identify a key portion of the one or more speech signals, the key portion comprising a series of patterns in the communication that are recognized by the speech recognition engine;
 store a tag identifying the key portion;
 retrieve the communication and the tag from the memory;
 in response to receiving a request to play the communication, play the communication in its entirety for a first end user, wherein while playing the communication in its entirety the at least one key portion is played a first time for the first end user; and
 after playing the communication in its entirety to the first end user and without requiring any further interaction from the first end user, automatically and immediately play the key portion of the communication identified by the tag for a second time for the first end user such that the communication is not replayed in its entirety.

25. The method of claim 1, further comprising:
 in response to receiving the request to play the communication from the first end user and prior to playing the communication to the first end user, prompting the first end user to enter a command indicating that the first end user desires to hear the key portion of the message replayed the second time after the playing of the communication in its entirety; and automatically playing the key portion of the communication identified by the tag the second time for the first end user in response to receiving the command.

26. The system of claim 12, wherein the processor is further operable to:

in response to receiving the request to play the communication from the first end user and prior to playing the communication to the first end user, prompt the first end user to enter a command indicating that the first end user desires to hear the key portion of the message replayed the second time after the playing of the communication in its entirety; and automatically play the key portion of the communication identified by the tag the second time for the first end user in response to receiving the command.

27. The system of claim 15, wherein the processor is further operable to:

in response to receiving the request to play the communication from the first end user and prior to playing the communication to the first end user, prompt the first end user to enter a command indicating that the first end user desires to hear the key portion of the message replayed the second time after the playing of the communication in its entirety; and automatically play the key portion of the communication identified by the tag the second time for the first end user in response to receiving the command.

28. The tangible non-transitory machine-readable medium of claim 24, wherein the logic is further operable to:

in response to receiving the request to play the communication from the first end user and prior to playing the communication to the first end user, prompt the first end user to enter a command indicating that the first end user desires to hear the key portion of the message replayed the second time after the playing of the communication in its entirety; and automatically play the key portion of the communication identified by the tag the second time for the first end user in response to receiving the command.

* * * * *